United States Patent Office 3,356,720
Patented Dec. 5, 1967

3,356,720
KETONES FROM SATURATED HYDROCARBONS AND CARBON MONOXIDE
Stanley B. Mirviss, Westfield, N.J., and Philip S. Skell, State College, Pa., assignors to Esso Research and Engineering Company, a corporation of Delaware
No Drawing. Filed July 1, 1963, Ser. No. 292,072
15 Claims. (Cl. 260—533)

This invention relates to a process for the production of oxygenated organic products from saturated hydrocarbons. More particularly, this invention relates to an improved process for the production of ketones and other oxygen-containing compounds by the reaction between saturated hydrocarbon compounds and carbon monoxide in the presence of an acidic type of material as catalyst.

It has been previously discovered that ketones, carboxylic acids and other oxygen-containing compounds may be produced by reacting a saturated aliphatic, i.e. acyclic or alicyclic, hydrocarbon with carbon monoxide in the presence of an acidic catalyst, e.g. a Friedel-Crafts catalyst. The results of the prior art process, however, have not been entirely satisfactory or commercially acceptable in view of the relatively low yields and selectivities of desired products obtained.

It has now been discovered that the reaction of saturated hydrocarbon compounds, and particularly of the group of hydrocarbon compounds described more fully hereinbelow, may be realized more effectively by reacting these hydrocarbon starting materials with carbon monoxide in the presence of a Friedel-Crafts catalyst by including relatively small amounts of tertiary alkyl halides, tertiary phenyl alkyl halides and tertiary phenyl carbinyl halides. The use of the above-mentioned halide compounds with carbon monoxide serves to modify the yield and selectivity. For some hydrocarbon feeds the selectivity may be changed to provide larger proportions of a particular preferred product and for other hydrocarbon feeds the yield of a particular product already selectively produced may be considerably improved. In each case, moreover, the amount of carbon monoxide reactively absorbed is raised when the reaction is conducted in the presence of the halide compound. Additionally, in the method of this invention induction periods are materially reduced.

The present process is applicable to the reaction of saturated hydrocarbons containing from 2 up to 25 carbon atoms, particularly aliphatic hydrocarbons, i.e. cyclic and acyclic, as well as alkylated aromatic hydrocarbons which contain one or more saturated aliphatic side chains.

Representative hydrocarbon compounds of the class that may be reacted in accordance with the process of the invention include the straight-chain and branched-chain saturated aliphatic hydrocarbons such as ethane, propane, butanes, pentanes, hexanes, heptanes, octanes, dodecanes and the like; the alicyclic hydrocarbons such as cyclobutane, cyclopentane, cyclohexane, the higher homologues thereof; the alkylated cycloparaffins such as methyl cyclopentane, methyl cyclohexane, hexylcyclohexane, and the like; and aralkyl hydrocarbons such as ethylbenzene, n-propylbenzene, butylbenzenes, cumene, dodecylbenzene, tetrahydronaphthalene, decahydronaphthalene and the like. The straight-chain aliphatic, i.e. acyclic, hydrocarbons are compounds especially suitable as the starting material in the reaction effected in accordance with the process of the present invention.

Generally speaking, the class of acidic catalysts to be employed in the process of the present invention is that classified as Friedel-Crafts catalysts. Illustrative of compounds suitable as catalysts are aluminum halides such as aluminum chloride, aluminum bromide or aluminum iodide, boron trifluoride-hydrogen fluoride, the boron trifluoride hydrates, the tri- and pentafluorides of antimony and phosphorus and combination of these with hydrogen fluoride, the chlorides of zinc, tin, iron, zirconium, titanium, copper and the like, with aluminum chloride or boron trifluoride-hydrogen fluoride being preferred. While, in general, all Friedel-Crafts catalysts are suitable for use in the process of the present invention, it has been found that certain compounds are unsatisfactory in catalytic effect, for example; aluminum fluoride and boron trifluoride, and thus such compounds are excluded from the scope of the term "Friedel-Crafts catalysts" as used herein.

The Friedel-Crafts catalyst may be used as such or supported on a substantially inert carrier such as charcoal, diatomaceous earth, firebrick and the like, however, an unsupported catalyst is preferred. In addition, the above catalyst compounds may be composited with one or more other compounds of the Friedel-Crafts type. Thus a hydrogen halide, e.g. hydrogen bromide or chloride may be included with the Friedel-Crafts catalyst or cocatalyst. Suitable amounts of hydrogen halide range from 10 to 300 mole percent based on the Friedel-Crafts catalyst and preferably 50 to 200 mole percent.

The amount of catalyst is generally within the range of about 10 to 200 mole percent based on the hydrocarbon reactant. Preferably, the weight of catalyst is such that the amount present is from about 50 to 150 mole percent of the total hydrocarbon mixture.

As stated above it has been found that relatively small amounts of a hydrocarbon substituted carbinyl halide wherein said halide is selected from chloride, bromide and iodide will greatly influence the reaction of saturated hydrocarbons with carbon monoxide in the presence of an acidic type of material and particularly a Friedel-Crafts catalyst. Representative of such hydrocarbon substituted carbinyl halides are the tertiary alkyl halides for example; 2-methyl-2-chlorobutane, 3-chloro-3-methylpentane, 2,2-dichloro-2,2-dimethylbutane, tert-butyl chloride and the like and the tertiary phenyl alkyl halides and tertiary phenyl carbinyl halides for example; 2-chloro-2-phenylpropane, triphenylmethyl chloride and the like. Tert-butyl chloride is particularly preferred for use in the present invention.

The amout of carbinyl halide to be employed may vary within relatively wide limits, although optimum amounts or percentages may be readily determined for each individual case. Generally, the concentration will vary from 0.5 or less to 25 mole percent and preferably 1 to 20 mole percent as calculated on the moles of Friedel-Crafts catalyst introduced into the reaction zone.

The desired results can be attained by using the carbinyl halide, carbon monoxide and saturated hydrocarbon without hydrogen present. However, hydrogen may be used in conjunction with the halide compound.

Any amount of CO is satisfactory providing that there is some carbon monoxide always present. A large excess of carbon monoxide is generally desirable, but not essential, since the rate of reaction is improved somewhat under these conditions. However, the total reaction pressure, which is partly governed by temperature, is the most important factor since the CO solubility depends on its partial pressure and the reaction rate is dependent on the CO solubility. The reaction may be carried out in such a way as to add intermittently certain required amounts of CO to maintain a constant total pressure.

The process of the present invention may be carried out in either batch or continuous operation. When using a batch type of operation, the saturated hydrocarbon, Friedel-Crafts catalysts and carbinyl halide are charged to a suitable autoclave preferably provided with means for agitation, e.g., a rocked autoclave, and the carbon monoxide and hydrogen is added thereto under pressures of up to about 500 atmospheres, preferably 1 to 300 atmospheres, as long as reaction occurs as evidenced by consumption of carbon monoxide and a decrease in pressure. The pressure may be maintained constant by intermittent or continuous addition of CO as necessary. The autoclave containing the reaction mixture is generally maintained at a temperature of from about −10 to about 250° C. and preferably 10 to 150° C. Although the interaction of saturated hydrocarbon, carbon monoxide and hydrgen occurs when the tertiary alkyl halide, tertiary phenyl alkyl halide or tertiary phenyl carbinyl halide is not added, the velocity of the reaction and especially the yield and selectivity are remarkably increased when these halides are present in the charge. When the tertiary alkyl, tertiary phenyl alkyl, or tertiary phenyl carbinyl halides are charged, the amount of hydrocarbon reacted will be increased as much as 2 to 6 times above that obtained without the halide present, as measured by products formed. The yield of lower (monomeric) ketone is the most substantially increased by means of this invention with both straight and branched hydrocarbons. Further, the yield of higher (dimeric) ketones is also increased with straight chain hydrocarbon feeds particularly. These results are accomplished without significant change in the yield of less desirable acidic materials. Thus, the net effect is to increase the total yield and the selectivity to the more desirable ketones. A substantially beneficial effect can also be obtained with these tertiary alkyl, tertiary phenyl alkyl, or tertiary phenyl carbinyl halides in the absence of hydrogen.

Upon completion of the reaction in the autoclave the reaction mixture is cooled and then vented through dry ice traps. If desired, samples of the noncondensable gas as well as the dry ice-condensable gas may be taken from the vented gas for analysis. Any unused CO and also any saturated hydrocarbon recovered in work-up may be reused by compression and recycle. The reaction mixture may be diluted with ether or other organic solvent for work-up or left as is and is subsequently hydrolyzed with water with cooling. Some concentrated HCl may be added with the water to dissolve any precipitated salts that might form. The resulting layers are separated and the organic layer is extracted with aqueous $NaHCO_3$ or other alkaline material to remove acidic materials, which may be recovered upon acidification of the $NaHCO_3$ extract and then extracted with an organic solvent. The diluent from the extractions if used is removed from the acidic and neutral materials by distillation.

The following examples serve to illustrate the invention, but they are not intended to limit it thereto.

Example 1

Four runs were made to illustrate the effect of tertiary butyl chloride in promoting the reaction of saturated hydrocarbons with carbon monoxide. In Run Nos. 1 and 2, n-butane was employed and in run Nos. 3 and 4 isobutane was employed. In all runs the mole ratio of butane to $AlCl_3$ catalyst was 1:1 and the carbon monoxide pressure was maintained at 1900–2000 p.s.i.g. In run Nos. 1 and 2 the reaction temperature was 30° C. and in run Nos. 3 and 4 the reaction temperature was 59° C.

The data as hereinafter tabulated show that the yield of methyl isopropyl ketone from either of the two butanes is increased about 2 to 3 times above that obtained without tert-butyl chloride present. The yield of higher (dimeric) ketones is markedly increased also, especially in the case of n-butane. It is to be particularly noted that the yield of acidic materials, which are not as desirable as the ketones, are not significantly affected.

| Run No. | Butane Used | Mole Percent tert-Butyl Chloride on Butane | Moles CO Absorbed/ Mole Butane[a] | Percent Butane Reacted[b] | Mole Percent on Butane Employed | | |
|---|---|---|---|---|---|---|---|
| | | | | | MIPK | $C_{10}$ $C_9$ Ketone[c] | Acids[d] |
| 1 | n-butane | None | 0.17 | 73 | 9 | 1 | 4 |
| 2 | n-butane | 5.0 | 0.38 | 100 | 26 | [e]43 | 6 |
| 3 | i-butane | None | 0.14 | 21 | 37 | 0.2 | None |
| 4 | i-butane | 5.0 | 0.30 | 100 | 94 | 4 | 2 |

[a] Based on pressure drop.
[b] Based on butane recovered after completion of run.
[c] Consists of tert-butyl isobutyl ketone only in the case of isobutane and sec-butyl isobutyl ketone; 2,3,6-trimethylheptanone-4, and other $C_9$ ketones in the case of n-butane.
[d] Mainly privalic acid and a trace of 2-methylbutyric acid in the case of isobutane and mainly 2-methylbutyric acid with some isobutyric acetic and/or pivalic acids in the case of n-butane.
[e] Contains in mole percent (on basis of percent butane charged), 19.1% sec-butyl isobutyl ketone, 10.1% 2,3,6-trimethyl heptanone-4 and 14.3% other $C_9$ ketones.

Example 2

A run made with $BF_3 \cdot 1H_2O$ and isobutane at a 1/1 mole ratio with 2000 p.s.i.g. CO failed to yield any product. The same run was made with 5 mole percent of tert-butyl chloride also present and methyl isopropyl ketone was obtained.

Example 3

In the procedure described in Example 1, the tert-butyl chloride is in turn replaced by tert-amyl chloride, phenyl dimethyl carbinyl chloride and triphenyl methyl chloride and in each case yield and selectivity is increased over the control.

Example 4

Following the procedure of Example 2, $AlBr_3$ and $AlI_3$ are found to be active and can replace $AlCl_3$ in the presence of the tert-butyl chloride or tert-butyl bromide.

What is claimed is:
1. In a process for preparing oxygenated organic compounds of the class consisting of ketones and carboxylic acids from a saturated hydrocarbon which comprises reacting a $C_2$–$C_{25}$ saturated hydrocarbon with carbon monoxide in the presence of a Friedel-Crafts catalyst, the improvement which comprises effecting such reaction in the presence of a hydrocarbon substituted carbinyl halide selected from the group consisting essentially of tertiary alkyl halides, tertiary phenyl alkyl halides and tertiary phenyl carbinyl halides wherein said halide is selected from the group consisting of chloride, bromide and iodide.

2. The process of claim 1 in which the amount of Friedel-Crafts catalyst employed is from about 10 to 200 mole percent based on the saturated hydrocarbon introduced into the reaction.

3. The process of claim 1 in which the concentration of hydrocarbon substituted carbinyl halide is from about 0.5 to 25 mole percent based on the Friedel-Crafts catalyst introduced into the reaction.

4. The process of claim 1 in which a hydrogen halide is employed as a cocatalyst in an amount ranging from about 10 to 300 mole percent based on the Friedel-Crafts catalyst introduced into the reaction.

5. The process of claim 1 in which hydrogen is employed in conjunction with the hydrocarbon substituted carbinyl halide.

6. In a process for preparing oxygenated organic compounds of the class consisting of ketones and carboxylic acids from a saturated hydrocarbon containing from 2 up to 25 carbon atoms which comprises reacting said saturated hydrocarbon with carbon monoxide in the presence of a Friedel-Crafts catalyst, the improvement which comprises effecting such reaction in the presence of from about 0.5 to 25 mole percent, based on the Friedel-Crafts catalyst, of a tertiary alkyl halide wherein said halide is selected from the group consisting of chloride, bromide and iodide.

7. The process of claim 6 in which the tertiary alkyl halide is tertiary butyl chloride.

8. The process of claim 6 in which the tertiary alkyl halide is tertiary-amyl chloride.

9. In a process for preparing oxygenated organic compounds of the class consisting of ketones and carboxylic acids from a saturated hydrocarbon containing from 2 up to 25 carbon atoms which comprises reacting said saturated hydrocarbon with carbon monoxide in the presence of a Friedel-Crafts catalyst, the improvement which comprises effecting such reaction in the presence of from about 0.5 to 25 mole percent, based on the Friedel-Crafts catalyst, of a compound selected from the group consisting of tertiary phenyl alkyl halides and tertiary phenyl carbinyl halides wherein said halide is selected from the group consisting of chloride, bromide and iodide.

10. The process of claim 9 in which the tertiary aralkyl halide is phenyl dimethyl carbinyl chloride.

11. The process of claim 9 in which the tertiary aralkyl halide is triphenyl methyl chloride.

12. In a process for preparing oxygenated organic compounds of the class consisting of ketones and carboxylic acids from a saturated hydrocarbon containing from 2 up to 25 carbon atoms which comprises reacting said saturated hydrocarbon with carbon monoxide in the presence of $AlCl_3$, and a hydrogen halide cocatalyst, the improvement which comprises effecting such reaction in the presence of from about 1 to 20 mole percent, based on $AlCl_3$, of a tertiary alkyl chloride.

13. The process of claim 12 in which the tertiary alkyl chloride is tertiary butyl chloride .

14. The process of claim 12 wherein said hydrogen halide is selected from the group consisting essentially of HBr and HCl.

15. The process of claim 12 wherein said process is carried out at a pressure of from 1 to 500 atmospheres and a temperature of from —10 to 250° C.

References Cited
UNITED STATES PATENTS 2,037,050 4/1936 Schaarschmidt _____ 260—597
2,346,701 4/1944 Pines et al. _____ 260—597

D. D. HORWITZ, *Primary Examiner.*